Figure 1:
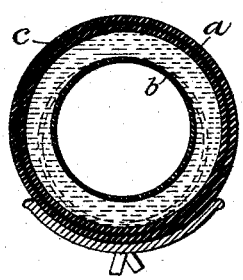

(No Model.)

H. S. OWEN.
TIRE FOR BICYCLES.

No. 497,965. Patented May 23, 1893.

Witnesses;
Sidney P. Hollingsworth
A. Mc. Parkins.

Inventor;
Herbert S. Owen
by his attorneys,
Kimie & Goldsborough.

UNITED STATES PATENT OFFICE.

HERBERT S. OWEN, OF WASHINGTON, DISTRICT OF COLUMBIA.

TIRE FOR BICYCLES.

SPECIFICATION forming part of Letters Patent No. 497,965, dated May 23, 1893.

Application filed October 18, 1892. Serial No. 449,259. (No model.)

*To all whom it may concern:*

Be it known that I, HERBERT S. OWEN, a citizen of the United States, residing at Washington, in the District of Columbia, have invented certain new and useful Improvements in Tires for Bicycles and other Vehicles; and I do hereby declare the following to be a full, clear, and exact description of the invention, such as will enable others skilled in the art to which it appertains to make and use the same.

My invention is designed to afford a flexible or elastic tire possessing the advantages of the ordinary pneumatic tire, obviating some of its disadvantages, and supplying additional features of merit which contribute to prolong its life and to enhance its general utility with respect both to the comfort of the rider and the attainable speed.

To this end, the characteristic feature of my invention consists in combining or associating for the tire portion of the wheel a plurality (two or more) of chambers or compartments, one of which shall contain a liquid and which shall preferably constitute the tread portion of the tire. A tire of this general construction embodies a structure made up of separate chambers or compartments one containing a non-compressible fluid, and another adjacent thereto containing a compressible and elastic fluid such as atmopheric air under pressure or some equivalent aeriform body. In an ordinary pneumatic tire, containing air under pressure, the advance of the wheel causes a continuous series of local compressions of the air at the point of contact with the ground, the propagation of these compressions throughout the tire occupying a sensible time, and occasioning a jumping or jolting motion more or less aggravated according to the character of the road-bed and the speed of travel. Moreover, where the conditions are such that these local compressions are excessive, an extraordinary strain is put upon the walls of the tire at the advancing point of contact, exposing them to danger of rupture that cannot be guarded against. These disadvantages and dangers are due to the local action of the compressing force upon the tire and it is the object of my invention to obviate them as far as possible by providing for the instantaneous transmission of the force, as it arises, to the entire outer periphery of the pneumatic chamber, so that it may be exerted thereon at all points with substantial equality. This function is secured by the action of the chamber containing the non-compressible fluid (preferably water) which chamber immediately propagates throughout its entire length, with uniformity, the force of impact at the point of contact with the ground, and therefore exerts a correspondingly uniform pressure at all times upon the periphery of its adjacent chamber containing the elastic, aeriform fluid. It results that the wheel in its travels hugs the ground more closely than the ordinary pneumatic tire and travels without its excessive jolting, jumping and jarring, and yet with a free elastic movement due to the presence of the pneumatic compartment and conducive to high speed and comfort. An additional advantage in the composite structure is that many a small puncture that would be fatal to the operativeness of a pneumatic tire is without effect when made in the walls of the liquid-containing compartment and will not occasion the collapse of the latter. This tends to prolong the life of the tire, and the substantially equal and uniform pressure exerted by the water upon all sides of the air-containing chamber insures the latter against bursting, while permitting it to be made of such thin, pliable, and elastic material as will permit the contained body of air when compressed by the surrounding water, to increase in elasticity.

In the accompanying drawings I have illustrated a number of exemplifications of my invention so as to illustrate quite fully its generic character. I have also shown my preferred form of valves for inflating and deflating the compartments or tubes.

Figure 13:
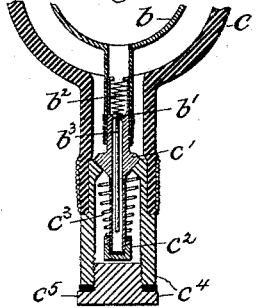
Figure 15:
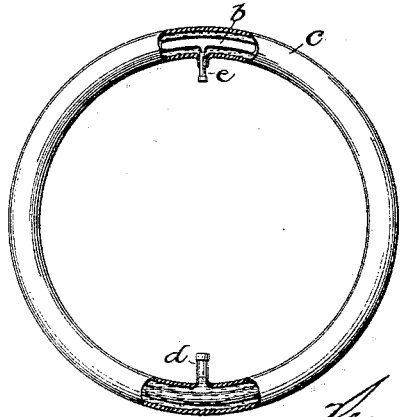
Figure 14:
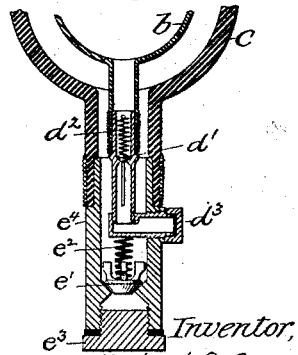

Referring to the drawings, Figure 1 represents, in cross-section, a wheel felly containing one form of modification of my invention, another arrangement being indicated in dotted lines. Figs. 2, 3, 4, 5, 6, 7, 8, 9, 10, 11 and 12 represent cross-sectional views of further modifications. Fig. 13 represents in vertical section a suitable arrangement of inflating and deflating valves. Fig. 14 represents a like view of a modification thereof, and Fig. 15 represents partly in section and partly in elevation a complete tire constructed in accordance with one of the modifications.

Similar letters of reference indicate similar parts throughout the several views.

Figure 7:
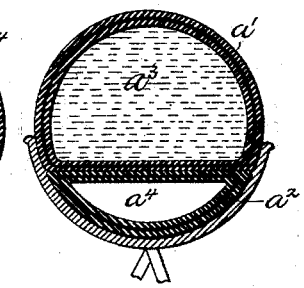
Figure 8:
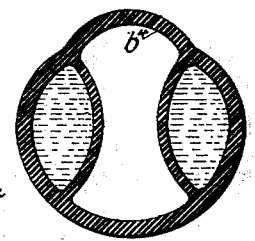

The tires may be provided with the customary inclosing elastic jacket $a$ as indicated for instance in Figs. 1, 3, 5, 7, 9, and 12; or, if made in two or more parts, each part may have a separate jacket, as $a'$ $a^2$ in Fig. 7.

Any suitable means, familiar to the art, may be employed for securing the tire within the wheel felly, as will be readily understood.

In the form of the invention shown in full lines in Fig. 1, $b$ indicates an inner elastic tube or compartment containing an aeriform fluid such as atmospheric air under pressure, and $c$ indicates an outer tube (preferably of rubber with a canvas backing) containing a non-compressible liquid such as water. Brine or other non-freezing liquid may be employed with advantage in cold weather. The outer tube may be supplied with its liquid filling by means of a valved nipple $d$ as shown in Fig. 15, and the inner tube may be inflated through the separate valved nipple $e$, as shown in said figure. But I prefer to employ but a single nipple for whatever number of tubes may be employed, as shown in Fig. 13 or Fig. 14, the valved filling tubes being arranged one within the other. Thus in Fig. 13, an inner tube $b$ is shown as provided with the valve $b'$ normally seated by the spring $b^2$, and having a stem $b^3$ extending into the hollow valve $c'$, whose end is closed by a screw cap $c^2$. The valve $c'$ is in its turn held to its seat by a spring $c^3$, the nipple $c^4$ being closed by the screw cap $c^5$. By unscrewing the caps $c^5$ and $c^2$ the inner tube may be filled. The screw cap $c^2$ may then be replaced and the outer tube may be filled, the screw cap $c^5$ being subsequently replaced to close the nipple. In Fig. 14, a similar valve $d'$ normally seated by the spring $d^2$ controls the passage to the inner tube and permits the filling of the inner tube through an opening closed by the screw cap $d^3$. The outer tube may be filled through the nipple $e^4$ having a valve $e'$, held to its seat normally by a spring $e^2$ and having a closing cap $e^3$. It is evident that, in like manner, a greater number of valved tubes or nozzles connecting each with a corresponding tube or compartment may be included one within the other.

Figure 2:
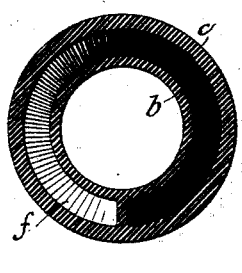
Figure 3:
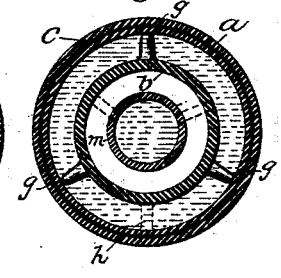

In dotted lines in Fig. 1, is indicated a modified arrangement for the inner tube, consisting in having the inner tube rest directly upon the inner surface of the outer tube. Ordinarily, in order to support the inner tube concentrically within the outer tube, the two are spaced apart by projections extending from the one to the other. Different forms of these spacing projections are shown in Figs. 2, 3, 4, and 10. Thus in Fig. 2 is illustrated a spiral web $f$, either separate from both tubes, or integral with either, or with both. In Fig. 3, the spacing is effected by stud-like projections $g$ or by a single rib $h$; in Fig. 4 the spacing is effected by perforated longitudinal ribs $k$, and in Fig. 10 by longitudinal perforated ribs $l$. In all of these cases, the ribs or projections permit communication between all parts of the annular space between the tubes or compartments so that the fluid in any one part of said space may not be isolated from the remainder.

Figure 4:
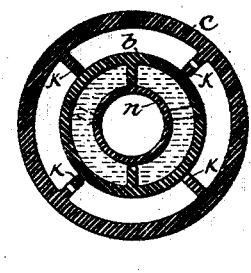
Figure 5:
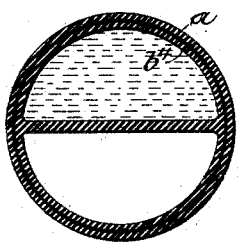

In Figs. 3 and 4 it will be noted that there is a plurality of tubes within the outer tube $c$. Thus in Fig. 3 I have shown within the pneumatic tube or chamber $b$, an inner liquid-containing tube or chamber $m$, and in Fig. 4 I have shown within the liquid-containing tube or chamber $b$, an inner pneumatic tube or chamber $n$; in this instance the outer tube $c$ is used as a pneumatic tube or chamber, i. e. a chamber containing an aeriform fluid, preferably air under pressure.

The tubes or chambers instead of being arranged one within the other may be arranged one upon the other, as indicated in Fig. 7, wherein $a^3$ represents the liquid-containing chamber and $a^4$ the pneumatic chamber, located the one above the other within the wheel felly. Or the tubes or chambers may constitute adjacent compartments formed by partition walls within the tube $b^4$ as indicated in Figs. 5, 6, 8 and 9, and containing respectively liquid and compressed air.

Figure 6:
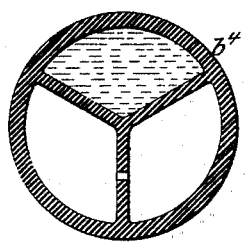
Figure 9:
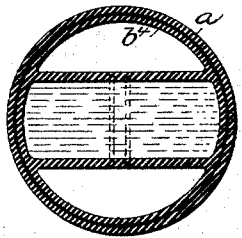
Figure 10:
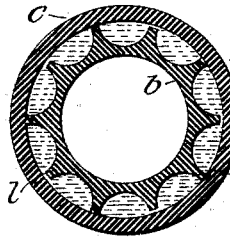

In Fig. 6 the two lower compartments are illustrated as put into communication with each other by perforations in the separating partition, and in Fig. 9 the uppermost and lowermost compartments containing compressed air or liquid, as the case may be, and separated by the middle compartment which correspondingly contains either liquid or compressed air, may be connected by means of tubes as indicated in dotted lines. A similar connection may be established between the innermost and outermost tubular chambers of Figs. 3 and 4, as indicated by dotted lines in those figures.

Figure 11:
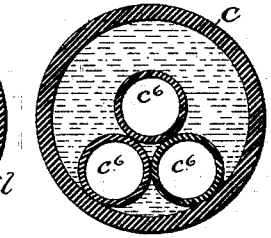
Figure 12:
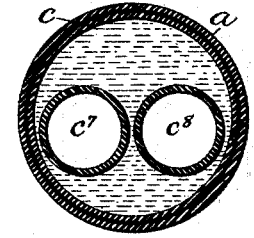

In Fig. 11, the inner tube is made up of a single tube $c^6$ capped at its ends and coiled in three coils as shown and in Fig. 12, there are two separate inner tubes $c^7$, $c^8$.

The walls of the pneumatic chambers, compartments, or tubes, adjacent to the liquid should preferably be of rubber, sufficiently soft and elastic to permit of the further compression of the contained body of air, when the compressive force of the water is exerted upon them.

While I prefer to fill the particular compartment or chamber constituting the tread of the tire with liquid, as fully illustrated in the drawings, yet, as also illustrated therein, I do not confine my invention to that arrangement, but in some cases contemplate the employment of air under pressure for the tread compartment or chamber of the tire. In both cases I will obtain advantages of the same kind, although in the former I believe they will be greater in degree.

It will be understood that where in the claims I use the word "fluid" without a qualifying adjective I intend to have its generic meaning of a liquid or an aeriform body.

Having thus described my invention, what I claim, and desire to secure by Letters Patent, is—

1. A wheel tire with a plurality of chambers or compartments one of said chambers or compartments containing a liquid, and another containing an aeriform fluid; substantially as described.

2. A wheel tire provided with a plurality of chambers or compartments adjacent to each other, one of said chambers or compartments containing a liquid and the other containing an aeriform fluid, substantially as described.

3. A wheel tire provided with a plurality of chambers or compartments adjacent to each other, one of said chambers or compartments containing a liquid and another containing an aeriform fluid, and an inclosing jacket; substantially as described.

4. A wheel tire provided with a plurality of independent chambers or compartments, one containing a liquid and another containing an aeriform fluid; substantially as described.

5. A wheel tire provided with a plurality of independent chambers or compartments one having an inclosing jacket and containing a liquid and another having a separate inclosing jacket and containing an aeriform fluid; substantially as described.

6. A wheel tire provided with a plurality of chambers or compartments, nested within each other, one containing a liquid and another containing an aeriform fluid; substantially as described.

7. A wheel tire provided with a plurality of chambers or compartments nested within each other, an outer one containing a liquid and an inner one containing an aeriform fluid; substantially as described.

8. A wheel tire provided at its tread portion with a compartment containing a liquid and having an additional compartment containing an aeriform fluid; substantially as described.

9. A wheel tire provided with a chamber or compartment containing a liquid and a plurality of chambers containing an aeriform fluid, the latter chambers communicating with each other; substantially as described.

10. A wheel tire provided with a plurality of chambers or compartments, an outer one containing a liquid and an inner one containing an aeriform fluid; substantially as described.

11. A wheel tire provided with a plurality of tubular chambers or compartments one within the other, one containing a liquid and another containing an aeriform fluid; substantially as described.

12. A wheel tire provided with a plurality of concentric tubular chambers or compartments one within the other, one containing a liquid and another containing an aeriform fluid; substantially as described.

13. A wheel tire provided with an outer compartment containing a fluid and a plurality of inner compartments one containing a liquid and another containing an aeriform fluid; substantially as described.

14. A wheel tire provided with an outer compartment containing a liquid, an inner compartment containing a liquid and an intermediate compartment containing an aeriform fluid; substantially as described.

15. A wheel tire provided at its tread portion with a compartment containing a liquid and having a plurality of inner compartments containing a fluid; substantially as described.

16. A wheel tire provided at its tread portion with a compartment containing a liquid, and having a plurality of inner compartments one containing a liquid and another containing an aeriform fluid; substantially as described.

17. A wheel tire provided with a plurality of fluid-containing chambers or compartments located one within the other, and separated from each other by spacing or supporting means extending from the one to the other; substantially as described.

18. A wheel tire provided with a plurality of fluid containing chambers or compartments located one within the other, and separated from each other by spacing or supporting means, all parts of the annular space thus provided between the compartments communicating with each other; substantially as described.

19. A wheel tire provided with a plurality of fluid-containing chambers or compartments located one within the other and separated from each other by rib spacing; substantially as described.

20. A wheel tire provided with a plurality of fluid-containing chambers or compartments located one within the other and separated from each other by rib spacing integral with one of the chambers; substantially as described.

21. A wheel tire provided with a plurality of fluid-containing chambers or compartments located one within the other and separated by a spiral rib; substantially as described.

22. A wheel tire provided with a plurality of fluid-containing chambers or compartments located one within the other and separated by a spiral rib integral with one of the chambers, substantially as described.

23. A wheel tire provided with a plurality of fluid-containing chambers one within the other and a plurality of valved charging or filling tubes one within the other; each of said tubes being provided with a separate end cap substantially as described.

24. A wheel tire provided with a plurality of fluid-containing chambers one within the other and a plurality of valved changing or filling tubes, one within the other, the valve of the outer tube being hollow so as to provide a passage way through said valve to the inner chamber; substantially as described.

In testimony whereof I affix my signature in presence of two witnesses.

HERBERT S. OWEN.

Witnesses:
D. G. STUART,
JOHN C. PENNIE.